US007061705B2

(12) United States Patent
Oosawa (10) Patent No.: US 7,061,705 B2
(45) Date of Patent: Jun. 13, 2006

(54) SIGNAL PROCESSING APPARATUS AND METHOD, RECORD MEDIUM, AND PROGRAM

(75) Inventor: Takao Oosawa, Tokyo (JP)

(73) Assignee: Sony Corporation, Tokyo (JP)

( * ) Notice: Subject to any disclaimer, the term of this patent is extended or adjusted under 35 U.S.C. 154(b) by 23 days.

(21) Appl. No.: 10/509,202

(22) PCT Filed: Mar. 13, 2003

(86) PCT No.: PCT/JP03/02968

§ 371 (c)(1),
(2), (4) Date: Sep. 23, 2004

(87) PCT Pub. No.: WO03/083870

PCT Pub. Date: Oct. 9, 2003

(65) Prior Publication Data

US 2005/0127222 A1    Jun. 16, 2005

(30) Foreign Application Priority Data

Mar. 28, 2002 (JP) .............................. 2002-092938

(51) Int. Cl.
*G11B 5/02* (2006.01)
(52) U.S. Cl. .......................................... 360/55; 360/69
(58) Field of Classification Search ................ 360/55, 360/69, 71, 72.1, 74.2, 74.3, 74.5, 137, 77.12, 360/78.02; 711/171; 377/18; 428/847.1
See application file for complete search history.

(56) References Cited

U.S. PATENT DOCUMENTS 4,280,159 A * 7/1981 Nakayama .................. 360/137
4,398,300 A * 8/1983 d'Alayer de Costemore d'Arc et al. . 377/18
4,411,008 A * 10/1983 d'Alayer de Costemore d'Arc et al. . 377/18
5,226,141 A * 7/1993 Esbensen .................... 711/171
5,808,824 A * 9/1998 Kaniwa et al. ............... 360/71
6,723,415 B1 * 4/2004 Ochi et al. ............... 428/847.1

FOREIGN PATENT DOCUMENTS

| JP | 2-81389 | 3/1990 |
| JP | 2-83879 | 3/1990 |
| JP | 5-234334 | 9/1993 |
| JP | 6-168509 | 6/1994 |

* cited by examiner

*Primary Examiner*—David Hudspeth
*Assistant Examiner*—Fred F. Tzeng
(74) *Attorney, Agent, or Firm*—Frommer Lawrence & Haug LLP; William S. Frommer (57) ABSTRACT

The present invention relates to a signal processing apparatus and method, a recording medium, and a program enabling accurate calculation of a remaining amount of a tape. In a cassette shell 1, a memory 13 for storing information indicative of a total length of a magnetic tape 11 is incorporated. A remaining-tape-amount calculation apparatus 22 calculates a length of the tape as an amount of being wound around a reel 12-1 and a reel 12-2 on an assumption of a thickness of the tape being constant, and, for example, corrects a calculated tape length of the tape being retained wound around the reel 12-1 using a ratio of the total length of the magnetic tape 11, read out from the memory, to a sum of the calculated tape length of the tape being retained wound around the reel 12-1 and the tape length of the tape being put on wound around the reel 12-2 to calculate a remaining amount of the magnetic tape 11, which is recordable or reproducible. Incidentally, it is possible to apply the present invention to a VTR.

4 Claims, 6 Drawing Sheets

SIGNAL PROCESSING APPARATUS AND METHOD, RECORD MEDIUM, AND PROGRAM

This application is a 371 of PCT/JP03/02968 Mar. 13, 2003.

FIELD OF THE INVENTION

The present invention relates to a signal processing apparatus and method, a recording medium and a program, and more particularly, to a signal processing apparatus and method, a recording medium and a program each of which is capable of accurately calculating a remaining amount of a tape on and from which information is to be recorded and reproduced.

BACKGROUND ART

The remaining recordable or reproducible amount of a magnetic tape used in a tape magnetic recording/reproducing apparatus such as a VTR (Video Tape Recorder), a camcorder or an AIT (Advanced Intelligent Tape) backup system is generally calculated on the basis of the length of the magnetic tape which is currently wound on either one of a reel from which the magnetic tape is supplied (hereinafter referred to as the supply side reel) and a reel on a side for taking up the magnetic tape supplied (fed) from the supply side reel (hereinafter referred to as the take-up side reel).

However, in a case where the remaining amount of the magnetic tape is calculated in this manner, there is a problem that the calculation result contains an error corresponding to variations in thickness of magnetic tapes, so an accurate remaining amount cannot be detected. For example, if there are variations of 10% in tape thickness, calculations of the remaining tape amounts of 60-min tapes will contain an error of a maximum of 6 minutes which is 10% of 60 minutes.

DISCLOSURE OF THE INVENTION

The present invention has been made in view of the above-mentioned problem, and enables the remaining amount of each tape to be accurately calculated irrespective of the accuracy of tape thickness.

A signal processing device of the present invention is characterized by including first calculation means for calculating, on the basis of a rotation period of a supply side reel or a take-up side reel, a first length of a tape wound on the supply side reel and a second length of the tape wound on the take-up side reel, acquisition means for acquiring a total length of the tape, and second calculation means for correcting the first length or the second length by using the total length of the tape, and calculating a remaining amount of the tape that is recordable or reproducible.

The acquisition means is capable of acquiring the total length of the tape from a memory section contained in a recording medium.

The second calculation means is capable of multiplying the first length or the second length by a value gotten by dividing the total length of the tape by a sum of the first length and the second length, and obtaining a resultant value as the remaining amount of the tape.

A signal processing method of the present invention is characterized by including a first calculation step of calculating, on the basis of a rotation period of a supply side reel or a take-up side reel, a first length of a tape wound on the supply side reel and a second length of the tape wound on the take-up side reel, an acquisition step of acquiring a total length of the tape, and a second calculation step of correcting the first length or the second length by using the total length of the tape, and calculating a remaining amount of the tape that is recordable or reproducible.

A program for a first recording medium of the present invention is characterized by including a first calculation control step of controlling calculation, based on a rotation period of a supply side reel or a take-up side reel, of a first length of a tape wound on the supply side reel and a second length of the tape wound on the take-up side reel, an acquisition control step of controlling acquisition of a total length of the tape, and a second calculation control step, controlling calculation of a remaining amount of the tape that is recordable or reproducible, of correcting the first length or the second length by using the total length of the tape.

A program of the present invention is characterized by causing a computer to execute processing which includes a first calculation control step of controlling calculation, based on a rotation period of a supply side reel or a take-up side reel, of a first length of a tape wound on the supply side reel and a second length of the tape wound on the take-up side reel, an acquisition control step of controlling acquisition of a total length of the tape, and a second calculation control step, controlling calculation of a remaining amount of the tape that is recordable or reproducible, of correcting the first length or the second length by using the total length of the tape.

In the signal processing apparatus and method as well as the programs according to the present invention, the first length of the tape wound on the supply reel and the second length of the tape wound on the take-up reel are calculated on the basis of the rotation period of the supply reel or the take-up reel, then the total length of the tape is acquired, and then the first length or the second length is corrected by using the total length of the tape and the remaining amount of the tape that is recordable or reproducible is calculated.

A second recording medium of the present invention is characterized by including a tape on or from which information is to be recorded or reproduced, a supply reel on which the tape to be supplied is wound, a take-up reel onto which the tape supplied from the supply reel is to be wound, and a memory part which stores a total length of the tape.

BEST MODES FOR CARRYING OUT THE INVENTION

Figure 1:
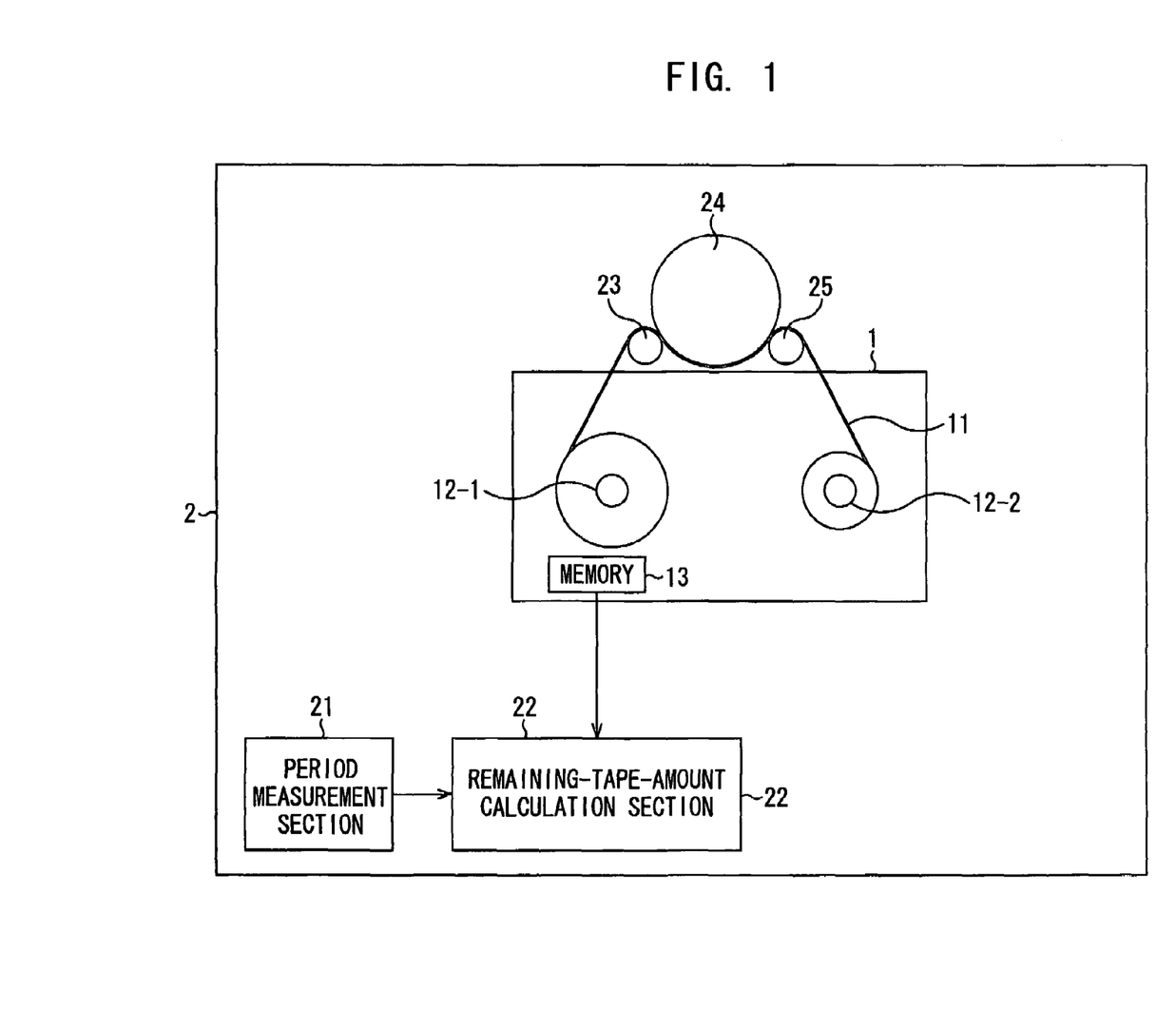
FIG. 1 is a view showing a utilization example of a remaining-tape-amount calculation apparatus to which the present invention is applied.

FIG. 1 shows a state in which a cassette shell 1 to which the present invention is applied is loaded in a recording/reproducing apparatus 2 to which the present invention is applied. The recording/reproducing apparatus 2 is a tape magnetic recording/reproducing apparatus such as a VTR, a camcorder or an AIT (Advanced Intelligent Tape) backup system.

In FIG. 1, in the construction of the recording/reproducing apparatus, there are shown only a period measurement section 21 and a remaining-tape-amount calculation apparatus 22 which are related to calculations of tape amounts, as well as a tape guide 23 and a tape guide 25 which perform tape feed, but illustrations of, for example, a mechanical deck section on which the cassette shell 1 are loaded, and a signal processing section which performs signal processing are omitted.

When the cassette shell 1 is loaded into the recording/reproducing apparatus 2, a magnetic tape 11 in the cassette shell 1 is fed from one reel 12 to another reel 12 according to recording/reproducing operation on the magnetic tape 11.

For example, as shown in FIG. 1, in a case where a reel 12-1 is a supply side reel and a reel 12-2 is a take-up side reel, the magnetic tape 11 is supplied from the supply side reel 12-1 to the take-up side reel 12-2 via the tape guide 23, a rotary drum 24 and the tape guide 25 of the recording/reproducing apparatus 2, and is wound onto the take-up side reel 12-2.

A memory 13 is incorporated in the cassette shell 1. This memory 13 stores information indicative of an actual total length $L_X$ of the magnetic tape 11.

Figure 2A:
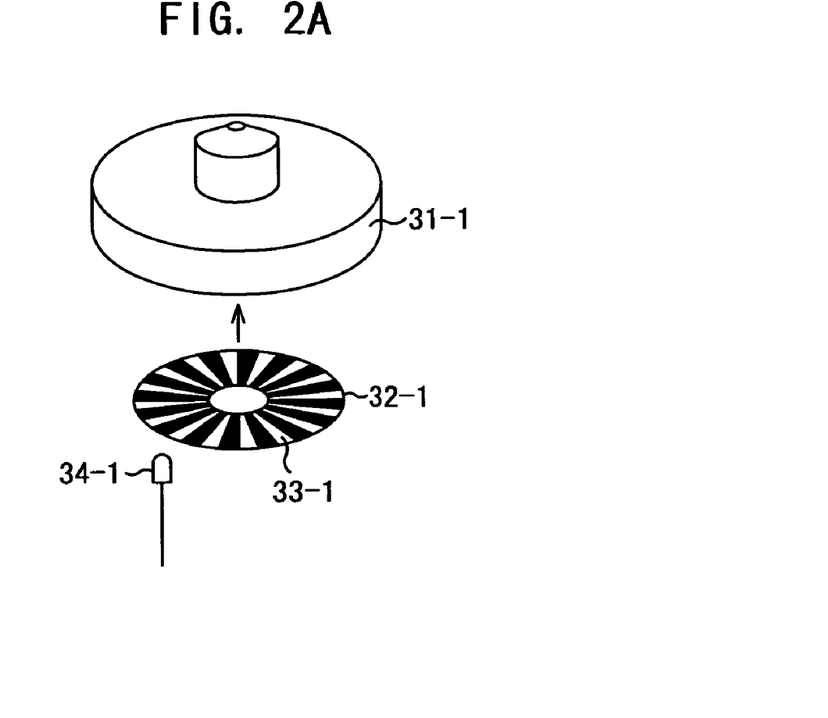
FIG. 2A is a view showing a structural example of a period measurement section.
Figure 2B:
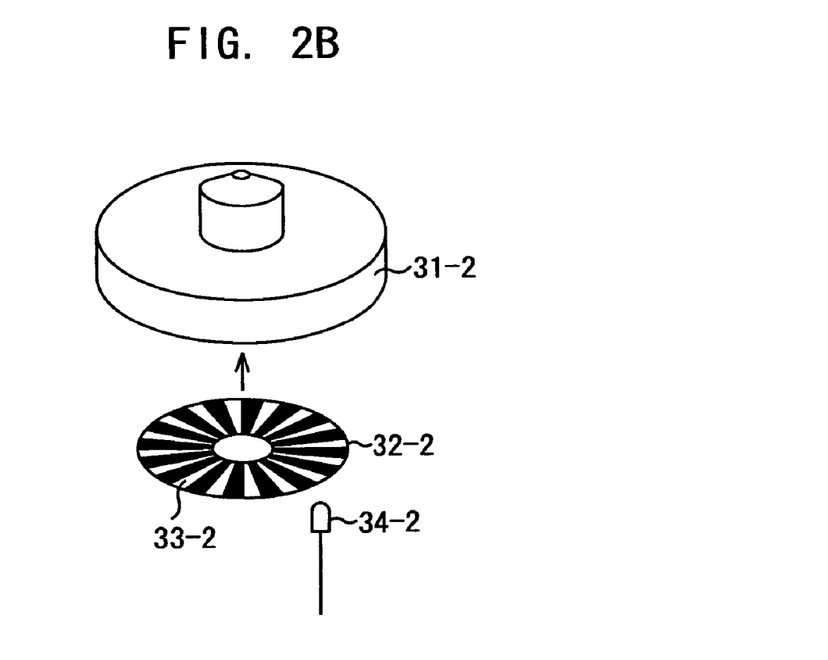
FIG. 2B is a view showing the structural example of a period measurement section.

The period measurement section 21 of the recording/reproducing apparatus 2, as shown in FIGS. 2A and 2B, is constructed with a reel table 31-1 onto which the supply side reel 12-1 of the cassette shell 1 is to be inserted and a reel table 31-2 onto which the take-up side reel 12-2 is to be inserted, a disk 32-1 and a disk 32-2 (each formed to have N-number of stripes 33) which are respectively attached to the reel table 31-1 and the reel table 31-2, and an optical sensor 34-1 and an optical sensor 34-2 which respectively detect the rotations of the disk 32-1 and the disk 32-2.

Namely, the period measurement section 21 counts pulse signals corresponding to the stripes 33 of the disks 32, which are obtained according to the rotations of the reel tables 31 and the disks 32 and outputted from the optical sensors 34, and measures the time required to count N-number of pulse signals, as the rotation periods of the reel tables 31 (the reels 12), and supplies the measurement result to the remaining-tape-amount calculation apparatus 22.

The remaining-tape-amount calculation apparatus 22 calculates the length $L_S$ of the tape remaining wound on the supply side reel 12-1 that is based on a case where the thickness of the magnetic tape 11 is constant and the length $L_T$ of the tape wound on the take-up side reel 12-2, by using the rotation periods of the reels 12 of the cassette shell 1 which have been supplied from the period measurement section 21, and calculate the remaining amount of the tape on the basis of the calculated length $L_S$ and length $L_T$ as well as the total length $L_X$ of the magnetic tape 11 that has been read from the memory 13 of the cassette shell 1.

The remaining-tape-amount calculation apparatus 22 outputs the calculated remaining tape amount to a not shown display section of the recording/reproducing apparatus so that the calculated remaining tape amount is displayed on the display section.

Incidentally, the transfer of information between the remaining-tape-amount calculation apparatus 22 of the recording/reproducing apparatus 2 and the memory 13 of the cassette shell 1 is performed by wire or wireless.

Figure 3:
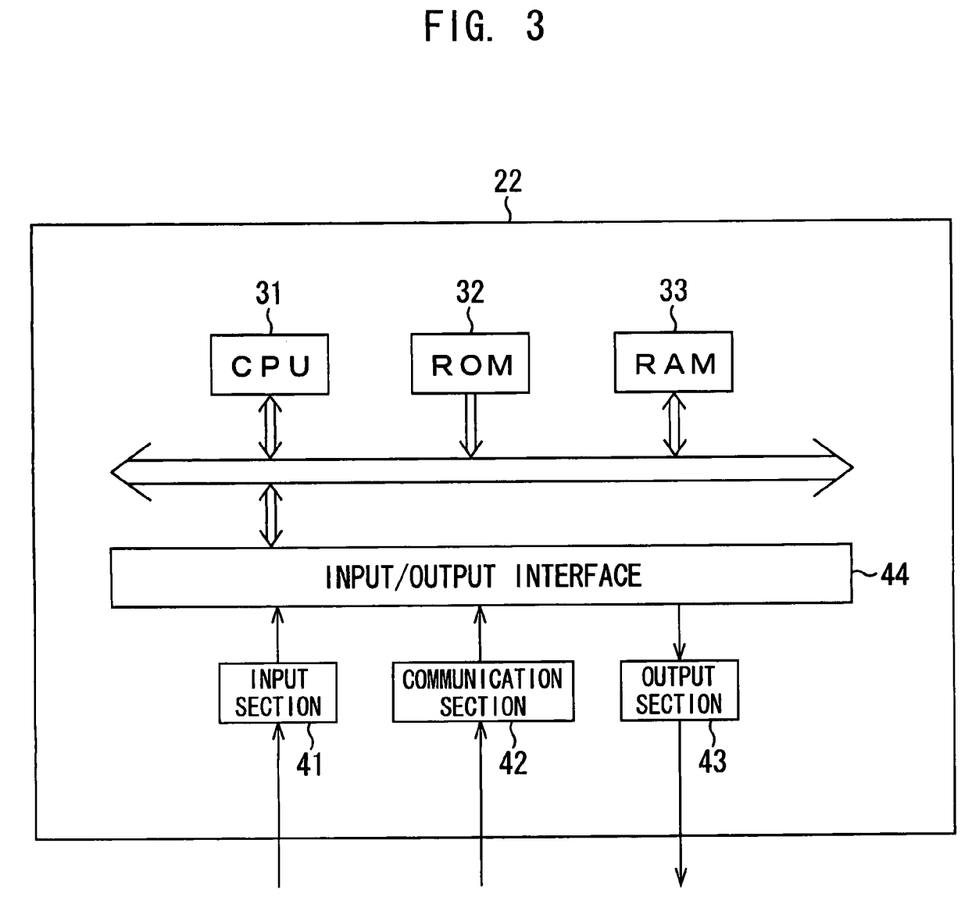
FIG. 3 is a block diagram showing an internal structural example of the remaining-tape-amount calculation apparatus of FIG. 1.

FIG. 3 shows an internal construction example of the remaining-tape-amount calculation apparatus 22. An input section 41 receives the rotation periods of the reels 12 outputted from the period measurement section 21, and supplies the rotation periods to a CPU 31 via an input/output interface 44. A communication section 42 communicates with the cassette shell 1 and acquires the information that indicates the total length $L_X$ of the magnetic tape 11 and is recorded in the memory 13, and supplies the information to the CPU 31 via the input/output interface 44.

An output section 43 outputs data (for example, the remaining amount of the tape) supplied from the CPU 31 to the not shown display section so that the data is displayed on the display section.

The CPU 31 loads a program stored in a ROM 32, for example, one for calculating the remaining tape amount, into a RAM 33, and executes the program on the basis of the rotation periods of the reels 12 supplied from the input section 41 and the total length $L_X$ of the magnetic tape 11 supplied from the communication section 42, and supplies the resultant remaining tape amount to the output section 43.

Incidentally, the program and the necessary data can be previously stored in the ROM 32 and be provided to users integrally with the remaining-tape-amount calculation apparatus 22, or they can be provided as package media such as magnetic disks, optical discs, magneto-optical discs or semiconductor memories or via satellites or networks.

Figure 4:
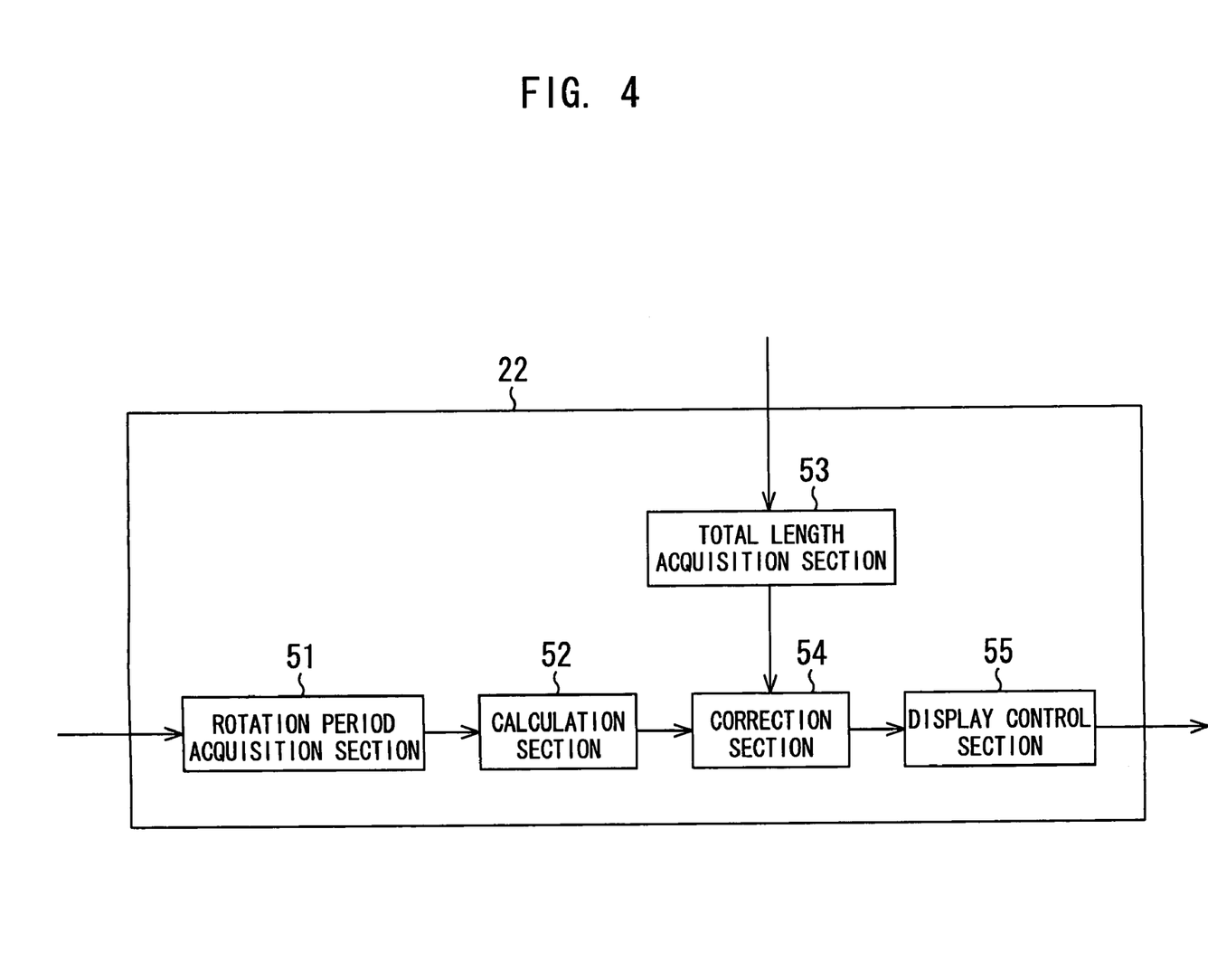
FIG. 4 is a functional block diagram of the remaining-tape-amount calculation apparatus of FIG. 1.

FIG. 4 shows a functional configuration example of the program for calculating the remaining tape amount.

A rotation period acquisition section 51 acquires the rotation periods of the supply side reel 12-1 and the take-up side reel 12-2 from the period measurement section 21, and supplies the rotation periods to a calculation section 52. The calculation section 52 calculates the length $L_S$ of the magnetic tape 11 remaining wound on the supply side reel 12-1 that is based on a case where the thickness is constant (there are no variations in thickness) and the length $L_T$ of the magnetic tape 11 wound on the take-up side reel 12-2, by using the rotation periods of the supply side reel 12-1 and the take-up side reel 12-2 which have been supplied from the rotation period acquisition section 51, and supplies the length $L_S$ and the length $L_T$ to a correction section 54.

A total length acquisition section 53 communicates with the cassette shell 1 and acquires the information that indicates the actual total length $L_X$ of the magnetic tape 11 and is recorded in the memory 13, and supplies the information to the correction section 54.

The correction section 54 corrects the length $L_S$ of the magnetic tape 11 remaining wound on the supply side reel 12-1 that has been supplied from the calculation section 52 in a case where the thickness thereof is constant, with a ratio of a sum of the length $L_S$ and the length $L_T$ of the take-up side reel 12-2 in a case where the thickness thereof is constant (a total length of the magnetic tape 11 in a case where the thickness is constant) to an actual total length $L_X$ of the magnetic tape 11 that is indicated by the information supplied from the total length acquisition section 53, and calculates the remaining tape amount. The correction section 54 supplies the calculated remaining tape amount to a display control section 55.

The display control section 55 outputs the remaining tape amount supplied from the correction section 54 to the not shown display section so that the remaining tape amount is displayed on the display section.

Incidentally, from among the blocks shown in FIG. 4, the rotation period acquisition section 51 is held in the input part 41 of FIG. 3. From among the blocks shown in FIG. 4, the calculation section 52 and the correction section 54 are held in the CPU 31, the total length acquisition section 53 is held in the communication section 42, and the display control section 55 is held in the output section 43.

In this manner, the remaining-tape-amount calculation processing in the remaining-tape-amount calculation apparatus 22 can be realized by software, but the remaining-tape-amount calculation apparatus 22 can also be realized by hardware by being constructed with a wired logic IC or the like.

Figure 5:
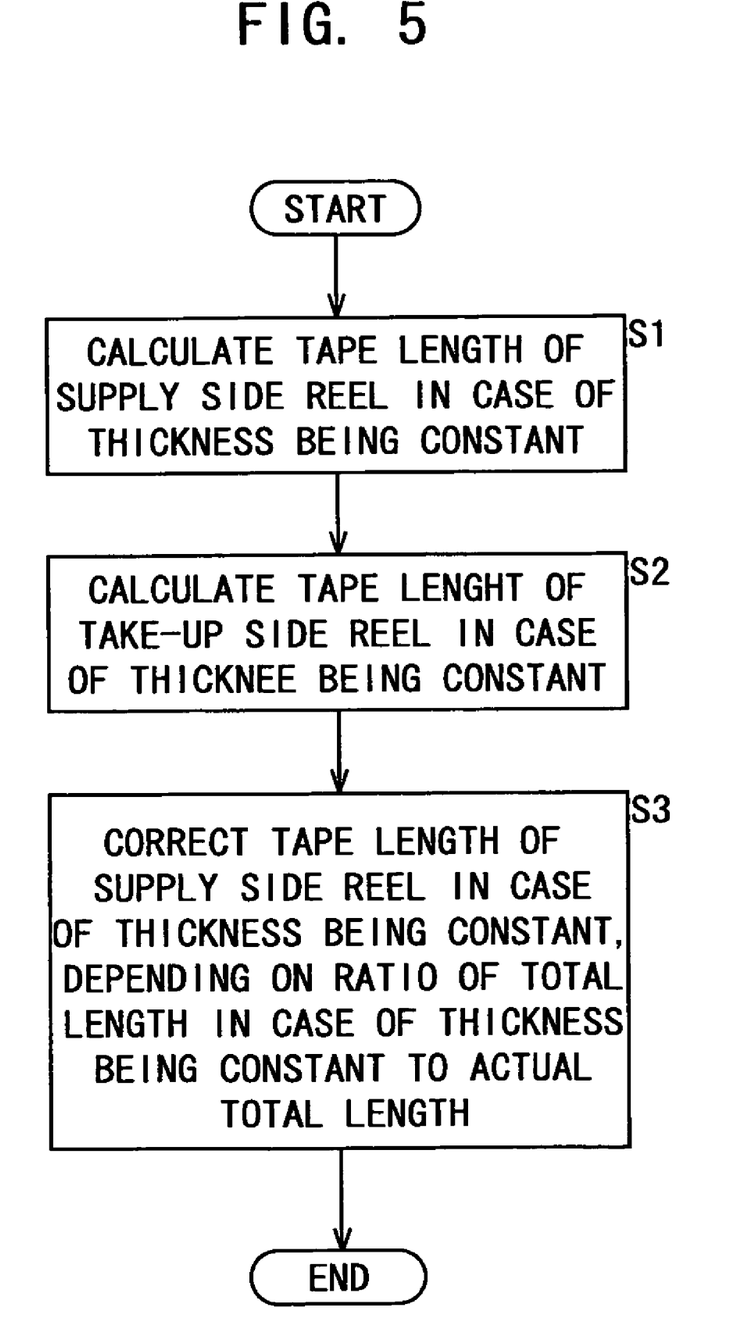
FIG. 5 is a flowchart for explaining operation of the remaining-tape-amount calculation apparatus of FIG. 1.

The operation of the remaining-tape-amount calculation apparatus 22 will be described below with reference to the flowchart of FIG. 5.

In step S1, the calculation section 52 of the remaining-tape-amount calculation apparatus 22 calculates according to Equation (1) the length $L_S$ of the magnetic tape 11 remaining wound on the supply side reel 12-1 in a case where the thickness thereof is constant at a standard value d (a case where there are no variations in thickness).

$$L_s = \frac{S_s}{d} \quad (1)$$

$S_S$ in Equation (1) is an area of a surface formed by the magnetic tape 11 wound on the supply side reel 12-1, and is calculated according to Equation (2).

$$S_S = \pi(R_S^2 - r_S^2) \quad (2)$$

Figure 6A:
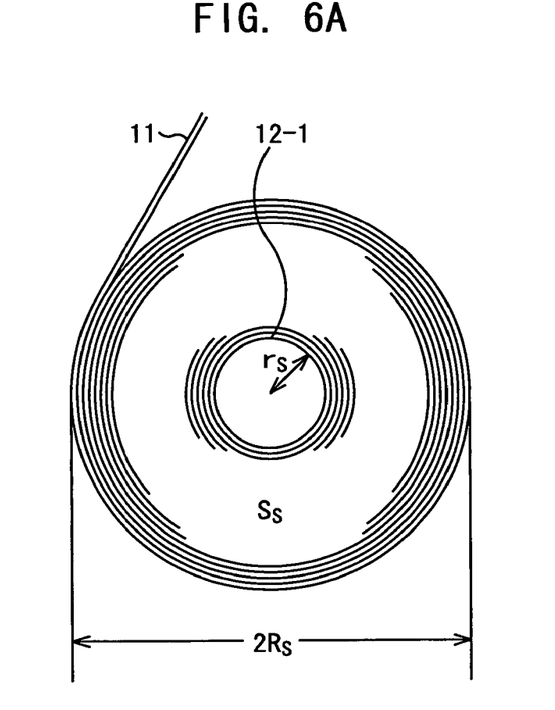
FIG. 6A is a view explaining a calculation method of a tape length.
Figure 6B:
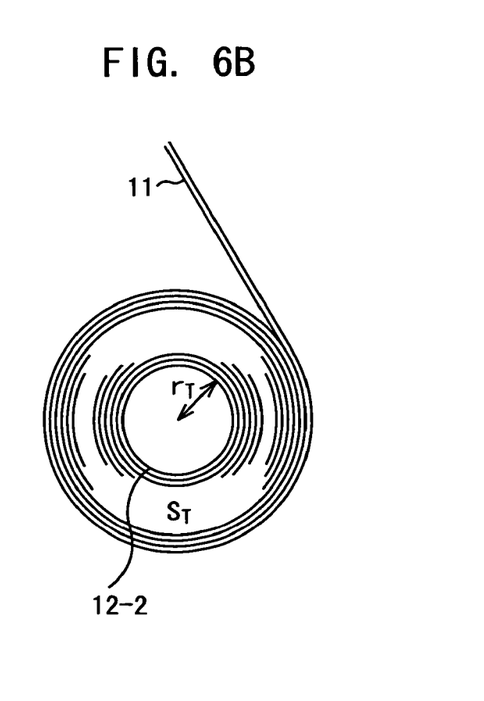
FIG. 6B is a view explaining the calculation method of the tape length.

$R_S$ in Equation (2) is a radius of the outer circumference of the magnetic tape 11 wound on the supply side reel 12-1 from the center of the supply side reel 12-1 (FIG. 6A), and $r_S$ is a hub radius of the supply side reel 12-1.

The hub radius $r_S$ is previously determined, but the radius $R_S$ of the outer circumference is calculated according to Equation (3).

$$R_s = \frac{vt_s}{2\pi} \quad (3)$$

In Equation (3), $t_S$ is the time (period) during which the supply side reel 12-1 rotates once and which is measured by the period measurement section 21, and $t_S$ is appropriately supplied to the remaining-tape-amount calculation apparatus 22 and is acquired by the rotation period acquisition section 51. Or, v is a standard value of tape feed speed.

Therefore, the length $L_S$ is calculated by Equation (1) being calculated with the area $S_S$ that is calculated according to Equation (4) obtained by substituting Equation (3) in Equation (2), as well as the standard value d.

$$S_s = \pi\left\{\left[\frac{vt_s}{2\pi}\right]^2 - r_s^2\right\} \quad (4)$$

Equation (3) is obtained by substituting Equation (5) which shows the relationship between the circular length 1 of the outer circumference of the magnetic tape 11 wound on the supply side reel 12-1 and the period $t_S$ as well as the tape feed speed v, into Equation (6) which shows the relationship between the radius $R_S$ of the outer circumference and the circular length 1 of the outer circumference.

$$l = v \times t_S \quad (5)$$

$$2\pi R_S = l \quad (6)$$

Then, in step S2, the calculation section 52 of the remaining-tape-amount calculation apparatus 22 calculates the length $L_T$ of the magnetic tape 11 wound on the take-up side reel 12-2 in a case where the thickness thereof is constant at the standard value d (a case where there are no variations in thickness). The specific calculation method is similar to the method of calculating the length $L_S$ in step S1, and although not described in detail, the length $L_T$ is found by substituting the area $S_T$ calculated by Equation (7) into Equation (8). In Equation (7), $t_T$ is the rotation period of the take-up side reel 12-2 (the value measured by the period measurement section 21), and $r_T$ is a hub radius of the take-up side reel 12-2.

$$S_T = \pi\left\{\left[\frac{vt_T}{2\pi}\right] - r_T^2\right\} \quad (7)$$

$$L_T = \frac{S_T}{d} \quad (8)$$

The calculation section 52 supplies to the correction section 54 the length $L_S$ of the magnetic tape 11 remaining calculated in step S1 wound on the supply section 12-1 in a case where the thickness is constant at the standard value d and the length $L_T$ of the magnetic tape 11 calculated in step S2 wound on the take-up side reel 12-2 in a case where the thickness is constant at the standard value d, respectively.

In Step S3, the correction section 54 corrects, for example, the length $L_S$ (the length of the magnetic tape 11 remaining wound on the supply side reel 12-1 in a case where the thickness is constant) and calculates the remaining amount of the magnetic tape 11. Specifically, as shown by Equation (9), the remaining tape amount is calculated by multiplying the length $L_S$ by the ratio of the sum of the length $L_S$ calculated in step S1 and the length $L_T$ calculated in step S2 (namely, the total length of the magnetic tape 11 in a case where the thickness is constant at the standard value d) to the actual total length $L_X$ of the magnetic tape 11 that has been supplied from the total length acquisition section 53 (the information recorded in the memory 13). REMAINING TAPE AMOUNT IN A CASE OF THE LENGTH $L_S$ BEING $$\text{CORRECTED} = L_X \times \frac{L_S}{L_S + L_T} \quad (9)$$

After that, the process comes to an end.

As described above, the length $L_S$ and the length $L_T$ in a case where the thickness is constant at the standard value d are calculated, and for example, the length $L_S$ is corrected with the ratio of ($L_S + L_T$) to the actual length $L_X$ of the magnetic tape 11, whereby it is possible to calculate the remaining amount of the tape which does not contain an error due to variations in thickness.

It is to be noted that in the above description the length $L_S$ is corrected to calculate the remaining amount of the magnetic tape 11, but as shown by Equation (10), the length $L_T$ can also be corrected to calculate the remaining amount of the tape. REMAINING TAPE AMOUNT IN A CASE OF THE LENGTH $L_T$ BEING $$\text{CORRECTED} = L_X \times \frac{L_T}{L_S + L_T} \quad (10)$$

In addition, the remaining-tape-amount calculation apparatus 22 can also calculate the remaining time of the tape which is based on the remaining amount of the tape, by Equation (11).

$$\text{TIME} = \frac{\text{REMAINING TAPE AMOUNT}}{v} \quad (11)$$

Incidentally, in the present specification, the steps which describe the program provided by a recording medium contain processes which are not necessarily processed in a time-series and are executed in parallel or individually, not to mention the processes which are performed in a time-series according to the described sequence.

INDUSTRIAL APPLICABILITY

According to the first present invention, on the basis of the rotation period of the supply side reel or the take-up side reel, the first length of the tape wound on the supply side reel and the second length of the tape wound on the take-up side reel are calculated to acquire the total length of the tape, and the first length or the second length is corrected using the total length of the tape. Accordingly, it is possible to accurately calculate the remaining amount of the tape recordable or reproducible.

According to the second present invention, since the total length of the tape is stored, it is possible to accurately calculate the remaining amount of the tape recordable or reproducible.

The invention claimed is:

1. A signal processing apparatus which performs recording or reproduction of information on or from a recording medium which is constituted by a tape, a supply side reel which supplies said tape, and a take-up side reel which takes up said tape supplied from said supply side reel thereon, characterized by comprising:
    first calculation means for calculating, on the basis of a rotation period of said supply side reel or said take-up side reel, a first length of said tape wound on said supply side reel and a second length of said tape wound on said take-up side reel;
    acquisition means for acquiring a total length of said tape from a memory section built in said recording medium; and
    second calculation means for correcting said first length or said second length by using the total length of said tape, and calculating a remaining amount of said tape that is recordable or reproducible, and characterized in that:
    said second calculation means multiplies said first length or said second length by a value gotten by dividing the total length of said tape by a sum of said first length and said second length, and obtains a resultant value as the remaining amount of said tape.

2. A signal processing method for a signal processing apparatus which performs recording or reproduction of information on or from a recording medium which is constituted by a tape, a supply side reel which supplies said tape, and a take-up side reel which takes up said tape supplied from said supply side reel thereon, characterized by comprising:
    a first calculation step of calculating, on the basis of a rotation period of said supply side reel or said take-up side reel, a first length of said tape wound on said supply side reel and a second length of said tape wound on said take-up side reel;
    an acquisition step of acquiring a total length of said tape from a memory section built in said recording medium; and
    a second calculation step of correcting said first length or said second length by multiplying said first length or said second length by a value gotten by dividing the total length of said tape by a sum of said first length and said second length to calculate a remaining amount of said tape that is recordable or reproducible.

3. A recording medium on which is recorded a computer-readable program for a signal processing apparatus which performs recording or reproduction of information on or from the recording medium which is constituted by a tape, a supply side reel which supplies said tape, and a take-up side reel which takes up said tape supplied from said supply side reel thereon, said program being characterized by comprising:
    a first calculation control step of controlling calculation, based on a rotation period of said supply side reel or said take-up side reel, of a first length of said tape wound on said supply side reel and a second length of said tape wound on said take-up side reel;
    an acquisition control step of controlling acquisition of a total length of said tape from a memory section built in said recording medium; and
    a second calculation control step of controlling a calculation of a remaining amount of said tape that is recordable or reproducible, performed by correcting said first length or said second length by multiplying said first length or said second length by a value gotten by dividing the total length of said tape by a sum of said first length and said second length.

4. A program embodied upon a computer-readable medium for a signal processing apparatus which performs recording or reproduction of information on or from a recording medium which is constituted by a tape, a supply side reel which supplies said tape, and a take-up side reel which takes up said tape supplied from said supply side reel thereon, characterized by causing a computer to execute processing including:
    a first calculation control step of controlling calculation, based on a rotation period of said supply side reel or said take-up side reel, of a first length of said tape wound on said supply side reel and a second length of said tape wound on said take-up side reel;
    an acquisition control step of controlling acquisition of a total length of said tape from a memory section built in said recording medium; and
    a second calculation control step of controlling a calculation of a remaining amount of said tape that is recordable or reproducible, performed by correcting said first length or said second length by multiplying said first length or said second length by a value gotten by dividing the total length of said tape by a sum of said first length and said second length.

* * * * *